United States Patent

Kubota

(10) Patent No.: US 9,148,561 B2
(45) Date of Patent: Sep. 29, 2015

(54) IMAGE CAPTURING APPARATUS, EXECUTABLE AUTOEXPOSURE BRACKETING AND CONTROL METHOD THEREOF

(71) Applicant: CANON KABUSHIKI KAISHA, Tokyo (JP)

(72) Inventor: Akira Kubota, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 14/108,493

(22) Filed: Dec. 17, 2013

(65) Prior Publication Data

US 2014/0176789 A1 Jun. 26, 2014

(30) Foreign Application Priority Data

Dec. 21, 2012 (JP) ................................ 2012-280064

(51) Int. Cl.
  *H04N 5/232* (2006.01)
  *H04N 5/235* (2006.01)
(52) U.S. Cl.
  CPC ......... *H04N 5/23219* (2013.01); *H04N 5/2351* (2013.01); *H04N 5/2354* (2013.01); *H04N 5/2356* (2013.01)

(58) Field of Classification Search
  None
  See application file for complete search history.

(56) References Cited

U.S. PATENT DOCUMENTS

| 2007/0196097 A1* | 8/2007 | Sugimoto | 396/234 |
| 2009/0027545 A1* | 1/2009 | Yeo et al. | 348/362 |
| 2010/0194963 A1* | 8/2010 | Terashima | 348/333.11 |

FOREIGN PATENT DOCUMENTS

JP 2008-104009 A 5/2008

* cited by examiner

*Primary Examiner* — Albert Cutler
(74) *Attorney, Agent, or Firm* — Carter DeLuca Farrell & Schmidt, LLP

(57) ABSTRACT

An image capturing apparatus comprises a capturing unit which captures an image; a detection unit which detects an object from the captured image; a generating unit which generates a luminance distribution of the captured image; a calculating unit which calculates, based on the luminance distribution, an exposure amount used when performing autoexposure bracketing that captures a plurality of images at different exposures; a determining unit which determines whether or not to perform the autoexposure bracketing using the calculated exposure amount; and a correcting unit which corrects the calculated exposure amount based on feature information of the object detected by the detection unit.

11 Claims, 14 Drawing Sheets

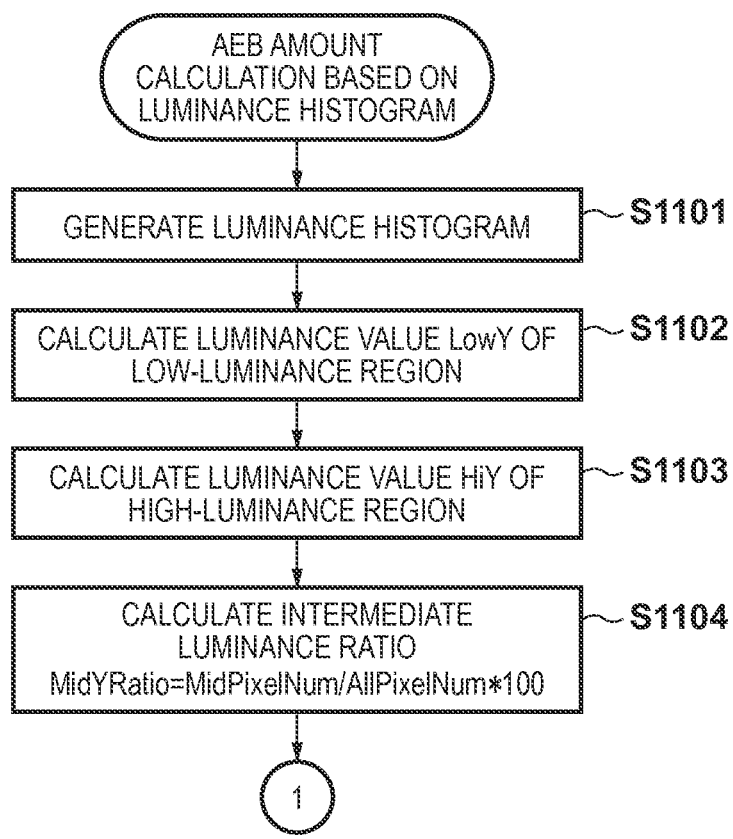
F I G. 11A

IMAGE CAPTURING APPARATUS, EXECUTABLE AUTOEXPOSURE BRACKETING AND CONTROL METHOD THEREOF

BACKGROUND OF THE INVENTION

1. Field of the Invention

The present invention relates to an image capturing apparatus and control method thereof, and particularly relates to shooting techniques for shooting multiple images at different exposures.

2. Description of the Related Art

Some image capturing apparatuses that shoot objects, such as cameras, have autoexposure (AE) control, where the object is shot at a correct exposure obtained by adjusting the aperture, shutter speed, and so on in accordance with the brightness of the object. There is an assumption that the object to be shot is often present in the center of the image, and thus there are AE control techniques that use selective photometry of a brightness in the center of the image, detect a contrast within the image and adaptively select which of a bright region and a dark region to use in selective photometry, and so on. A landscape scene in which a bright sky is present in an upper area of the image and dark land is present in a lower area of the image, a backlit scene in which a dark person is present in the foreground and bright sunlight is present in the background, and so on can be given as examples of scenes where such contrast is present in the image. In such scenes, it is desirable to identify a main object that a user wishes to shoot and enable that main object to be shot at a correct exposure. However, realistically speaking, there are cases where the AE control cannot always be realized according to the intentions of the user, which results in a failure to achieve the intended exposure.

Automatic exposure bracketing (AEB), in which brighter and darker images whose exposures are shifted by a specified amount from the AE-determined exposure are shot along with the original image, is known as a technique for addressing such situations where the exposure determined through AE does not necessarily result in the user's intended composition. Shooting using AEB records multiple images at different exposures, and thus the user can select the image that best fits his or her preferences later on.

However, AEB requires the user to specify an exposure amount in advance, and thus users have been required to perform operations for making settings in accordance with each new scene.

For example, Japanese Patent Laid-Open No. 2008-104009 focuses on a luminance range of an image sensor, and discloses determining the exposure so that the exposure falls within the luminance range.

Japanese Patent Laid-Open No. 2008-104009 determines the exposure by focusing on the luminance range of the image sensor, and thus does not take into consideration factors such as the compositional intent, the photographic quality of the image, and so on used in determining the correct exposure for a given scene. For example, there are cases where an appropriate AEB amount when the face region of a person is present in the image, an appropriate AEB amount based on color information within the image, and so on cannot be determined, resulting in a sub-optimal image.

SUMMARY OF THE INVENTION

The present invention has been made in consideration of the aforementioned problems, and realizes a shooting technique that, when shooting multiple images at different exposures, can determine an appropriate exposure amount for a given scene by taking into consideration a state of an object, a state of a background, and so on.

In order to solve the aforementioned problems, the present invention provides an image capturing apparatus comprising: a capturing unit configured to capture an image; a detection unit configured to detect an object from the captured image; a generating unit configured to generate a luminance distribution of the captured image; a calculating unit configured to calculate, based on the luminance distribution, an exposure amount used when performing autoexposure bracketing that captures a plurality of images at different exposures; a determining unit configured to determine whether or not to perform the autoexposure bracketing using the calculated exposure amount; and a correcting unit configured to correct the calculated exposure amount based on feature information of the object detected by the detection unit.

In order to solve the aforementioned problems, the present invention provides a control method of an image capturing apparatus having a capturing unit that captures an image and a detection unit that detects an object from the captured image, the method comprising: a generating step of generating a luminance distribution of the captured image; a calculating step of calculating, based on the luminance distribution, an exposure amount used when performing autoexposure bracketing that captures a plurality of images at different exposures; a determining step of determining whether or not to perform the autoexposure bracketing using the calculated exposure amount; and a correcting step of correcting the calculated exposure amount based on feature information of the object detected by the detection unit.

According to the present invention, when shooting multiple images at different exposures, an appropriate exposure amount for a given scene can be determined by taking into consideration a state of an object, a state of a background, and so on.

Further features of the present invention will become apparent from the following description of exemplary embodiments (with reference to the attached drawings).

BRIEF DESCRIPTION OF THE DRAWINGS

FIGS. 11A and 11B are flowcharts illustrating an AEB amount calculation process, indicated in FIG. 10, that is based on a luminance histogram.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, descriptions will be given of an embodiment in which the present invention is applied in an image capturing apparatus, such as a digital camera, that has an autoexposure bracketing function for shooting a plurality of images at exposures that are different from a correct exposure.

Apparatus Configuration

An overview of the configuration and functions of an image capturing apparatus according to an embodiment of the present invention will be given with reference to FIG. 1.

Figure 1:
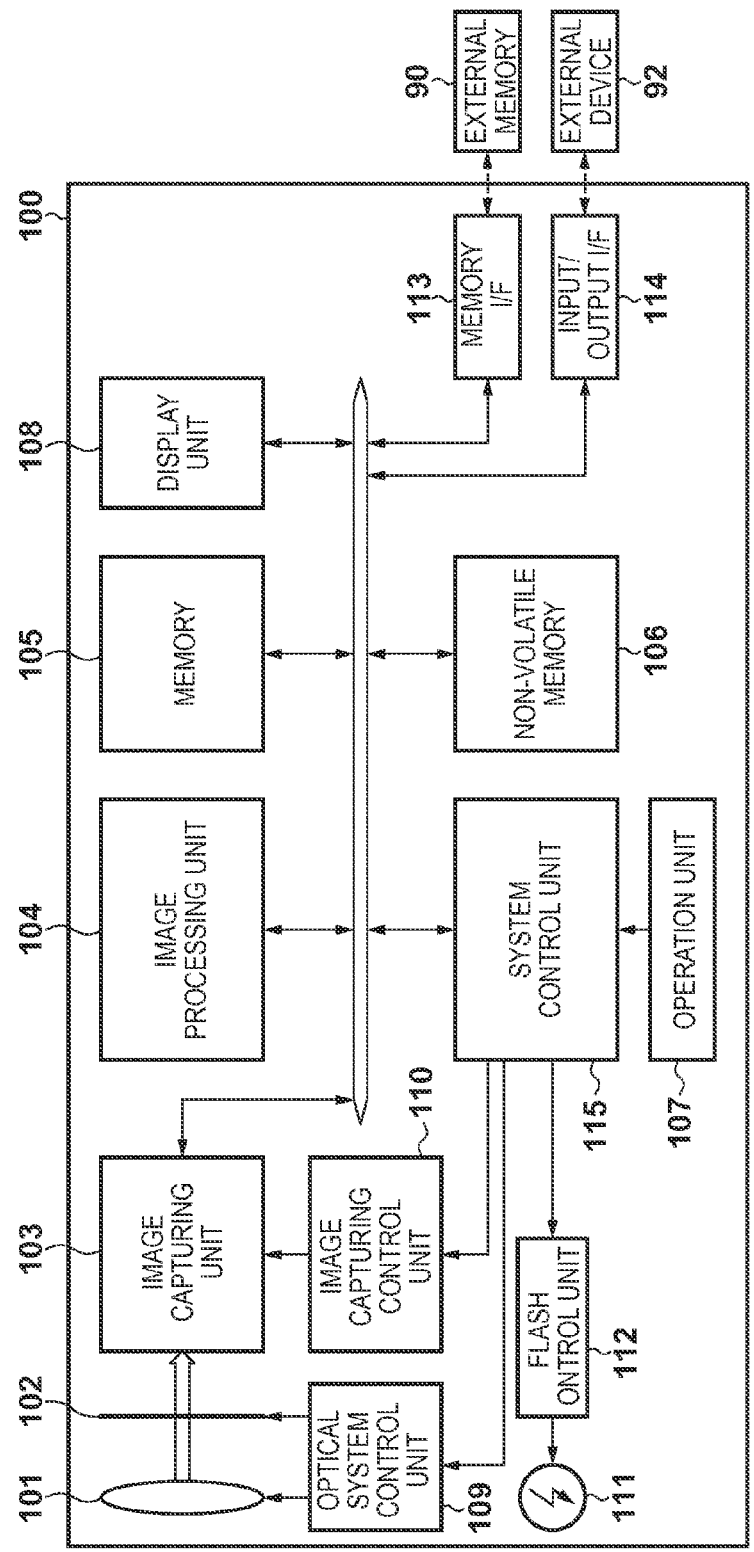
FIG. 1 is a block diagram illustrating the configuration of an image capturing apparatus according to an embodiment of the present invention.

In FIG. 1, a shooting lens 101 includes a focusing lens, a zoom lens, and the like, and based on operational instructions from an optical system control unit 109, forms an optical image of light reflected by an object on a light-receiving surface of an image capturing unit 103 with the light from the object being focused on the light-receiving surface thereof. An aperture/shutter 102 controls the amount of reflected light of the object, corresponding to the optical image, that is incident on the image capturing unit 103 based on operational instructions from the optical system control unit 109. Based on control signals from a system control unit 115, the optical system control unit 109 can adjust the amount of light traversing the lenses by controlling a position of the shooting lens 101 in an optical axis direction, controlling operations of the aperture/shutter 102, and so on. Various methods for adjusting the light amount are available, such as employing an iris diaphragm that changes the diameter of the aperture, an ND filter that reduces the amount of transmitted light, a mechanical shutter that blocks light by fully closing, and so on; different methods are used depending on the application. The optical system control unit 109 is also capable of performing image stabilization by driving the lenses in directions aside from the optical axis direction in response to the apparatus shaking. The image stabilization can be realized in a similar manner by displacing the image capturing unit 103.

The image capturing unit 103 converts the optical image formed on the light-receiving surface into an electrical signal using a photoelectric conversion element such as a CCD, a CMOS, or the like. The image capturing unit 103 includes an A/D converter that converts an analog signal obtained through the photoelectric conversion into a digital signal. The image capturing unit 103 also includes a CDS circuit that removes noise from the analog signal, a nonlinear amplifying circuit for amplifying the analog signal in a nonlinear manner before the analog signal is converted into the digital signal, and so on. An image capturing control unit 110 controls a charge accumulation time for the image capturing unit 103, the A/D converter, the CDS circuit, the nonlinear amplifying circuit, and the like in accordance with control signals from the system control unit 115. The image capturing unit 103 exposes the photoelectric conversion element, adjusts the exposure amount, reads out, amplifies, attenuates, and digitally converts a charge signal, and so on in accordance with operational instructions from the image capturing control unit 110. The digital signal output from the image capturing unit 103 is output to an image processing unit 104, but is also temporarily stored in a memory 105. The memory 105 is an example of a high-speed internal memory, and is used as a high-speed buffer for temporarily storing image data, a working memory for compressing/decompressing image data, or the like.

A flash 111 emits flash light in accordance with an operational instruction from a flash control unit 112. When the flash control unit 112 causes the flash 111 to emit light based on a control signal from the system control unit 115, a sufficient light amount is obtained, even in the case where the object luminance is low, which makes it possible to maintain a high shutter speed even in dark scenes and obtain an image having an optimal brightness.

The image processing unit 104 generates image data by performing predetermined pixel interpolation, resizing processes such as image reduction, color conversion processing, and so on directly on the digital signal output from the image capturing unit 103 or on a digital signal read out from the memory 105. The image processing unit 104 also temporarily stores the generated image data in the memory 105, and converts the format of the generated image data for recording in/outputting to an external memory 90, an external device 92, or the like.

In addition, the image processing unit 104 extracts luminance components, frequency components, and so on from the digital signals sequentially output from the image capturing unit 103, and uses these components as evaluation values for performing processes such as an AE (autoexposure) process, an AF (autofocus) process, an AWB (auto white balance) process, and so on. Furthermore, the image processing unit 104 can adjust the image quality by performing a developing process on the image data obtained from the image capturing unit 103, finishing the image into an image suitable for viewing by setting the color tone, gradation, brightness, and so on to appropriate values. Further still, the image processing unit 104 has an object detection function for detecting objects, such as faces of people, in the image data obtained from the image capturing unit 103. In addition to using the object detection function to extract feature information regarding the position, size, tilt, facial certainty, and so on of a face region of a person in a shot image, the image processing unit 104 has a personal authentication function for authenticating specific individuals using the extracted feature information. In the personal authentication, the image processing unit 104 reads out the feature information of individuals pre-registered in a non-volatile memory 106 and determines a match by comparing that feature information to the feature information of the face of the person extracted from the shot image. Furthermore, the image processing unit 104 can perform a detailed analysis on the face of a person, and can, for example, detect the direction of the person's line of sight by analyzing that person's eyes.

A display unit 108 is an LCD or the like, and displays images, operational assistance screens, and statuses of the camera, as well as displaying an AF region in a shooting screen when shooting an image.

The non-volatile memory 106 is a memory that can be recorded to and deleted electrically, and is configured of, for example, a flash memory. Image files generated by the image processing unit 104 and the like are stored in the non-volatile memory 106, and operational constants, programs, and so on are also stored therein, using the non-volatile memory 106 as a ROM for the system control unit 115. Here, "programs" refers to programs for executing the various flowcharts according to the present embodiment, which will be described later.

The system control unit 115 includes a CPU, a ROM, and a RAM, and the overall operation of the apparatus 100 is controlled by the CPU loading programs stored in the ROM into a working area of the RAM and executing those programs. The system control unit 115 implements the respective processes according to the present embodiment, mentioned later, by executing programs recorded in the non-volatile memory 106 mentioned above. The system control unit 115 also carries out display control by controlling the image processing unit 104, the memory 105, the display unit 108, and so on.

The image capturing apparatus 100 is provided with a slot into which the external memory 90, which is a memory card or the like, can be inserted and removed from, and is capable of accessing the external memory 90 via a memory interface 113. Furthermore, the image capturing apparatus 100 includes an input/output interface 114 for communicably connecting to the external device 92 over wires or wirelessly, and is capable of exchanging image files, commands, and so on with the external device 92.

An operation unit 107 includes, for example, a power switch, a shutter switch, a menu switch for setting exposure correction values, aperture values, making various types of settings such as settings during image reproduction, and so on, a zoom lever for instructing the shooting lens to perform zoom operations, a mode toggle switch for toggling between a shooting mode and a reproduction mode, and so on. The shutter switch outputs a first switch signal SW1 to the system control unit 115 when depressed halfway, resulting in shooting preparation operations such as AE processing, AF processing, and the like being executed; when the shutter switch is then fully depressed, a second switch signal SW2 is output to the system control unit 115, instructing the shooting to be carried out.

Figures 2A, 2B:
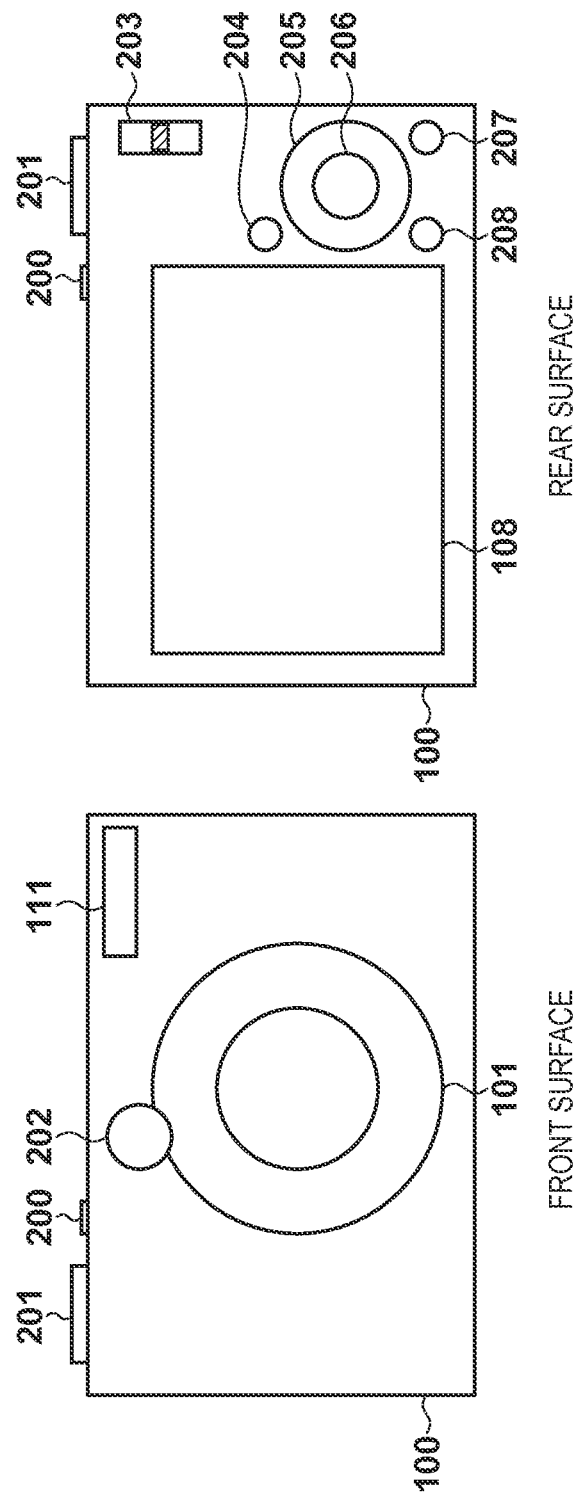
FIG. 2A is an external view of a front surface of the image capturing apparatus according to the embodiment.
FIG. 2B is an external view of a rear surface of the image capturing apparatus according to the embodiment.

As shown in the external view of the image capturing apparatus 100 according to the present embodiment in FIG. 2, the shooting lens 101 is disposed on a front surface of the apparatus 100 and can capture an image of an object. The flash 111 is also disposed on the front surface of the apparatus 100. Operation members 200 to 208 function as the operation unit 107 and accept user operations, and output corresponding operation signals to the system control unit 115.

Automatic Exposure Bracketing (AEB)

Next, a method for determining an AEB amount performed by the image capturing apparatus according to the present embodiment will be described with reference to FIGS. 3 through 8.

Figure 3:
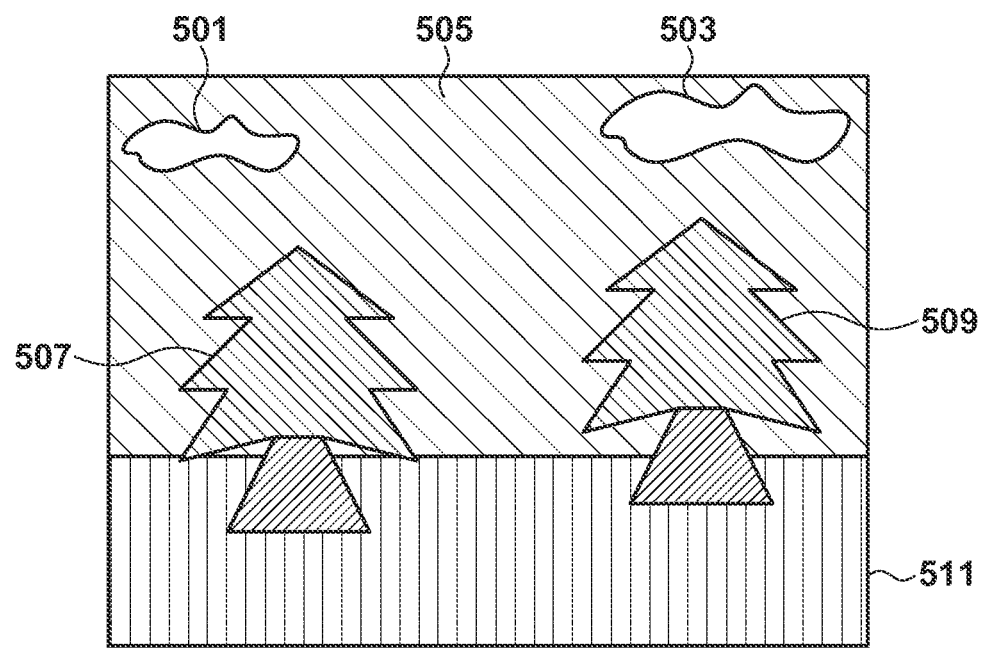
FIG. 3 is a diagram illustrating an example of a landscape scene.

In the landscape scene shown in FIG. 3, clouds 501 and 503, a sky 505, trees 507 and 509, and ground 511 are present in the image; the clouds and sky have a high luminance, whereas the trees and ground have a low luminance. In a scene where such a contrast is present, photometry that averages the overall image can result in highlight-detail loss, where the clouds, sky, and so on are brighter than the target luminance, and shadow-detail loss, where the trees, ground, and so on are darker than the target luminance, resulting in an unappealing image. By shooting a scene having such a contrast using AEB, it is possible to shoot an image at an exposure that prioritizes the appearance of the clouds, sky, and so on and an image at an exposure that prioritizes the appearance of the trees, ground, and so on as a single set.

Figure 4A:
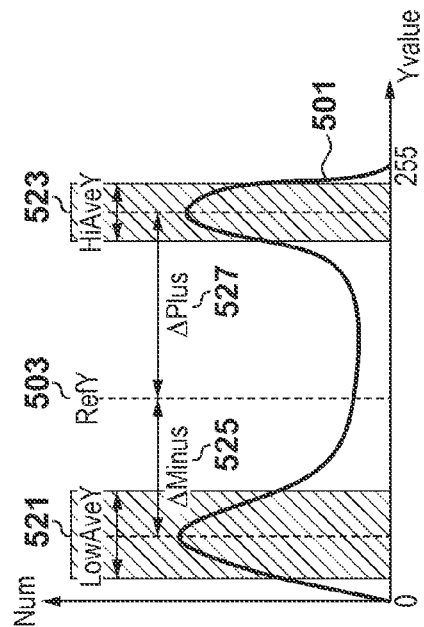
FIGS. 4A to 4C are diagrams illustrating luminance histograms for the overall image shown in FIG. 3.

FIG. 4A illustrates a luminance histogram for the overall image in FIG. 3, where the horizontal axis represents a luminance value Yvalue and the vertical axis represents a pixel number Num of pixels distributed among the respective luminance values. RefY 503 in FIGS. 4A to 4C indicates a target luminance value used in normal AE processing. In a normal AE process, the exposure value is determined so that the luminance values in the metered regions approach the target luminance RefY 503. Using the target luminance RefY 503 as a reference, it can be seen that main distributions, which are large distribution curves, are present on a low-luminance side and a high-luminance side of the luminance histogram; this indicates that the image has a high level of contrast. A method that finds an exposure value at which the regions having the main distributions on the low-luminance side and the high-luminance side approach the target luminance RefY 503 can be used as a method for calculating the AEB amount using the luminance histogram.

In FIG. 4A, the luminance value at an apex of the main distribution on the low-luminance side of the target luminance RefY 503 is indicated by LowY 511, whereas the luminance value at an apex of the main distribution on the high-luminance side of RefY 503 is indicated by HiY 513. In this case, an AEB amount resulting in a brightness equivalent to a number of stops calculated through the following formula may be used for the low-luminance peak value LowY 511 to approach the target luminance RefY 503.

$$\Delta\text{Minus} = \log_2(\text{Ref}Y/\text{Low}Y)$$

Likewise, a positive AEB amount resulting in darkening equivalent to a number of stops calculated through the following formula may be used for the high-luminance peak value HiY 513 to approach the target luminance RefY 503.

$$\Delta\text{Plus} = \log_2(\text{Ref}Y/\text{Hi}Y)$$

Figure 4C:
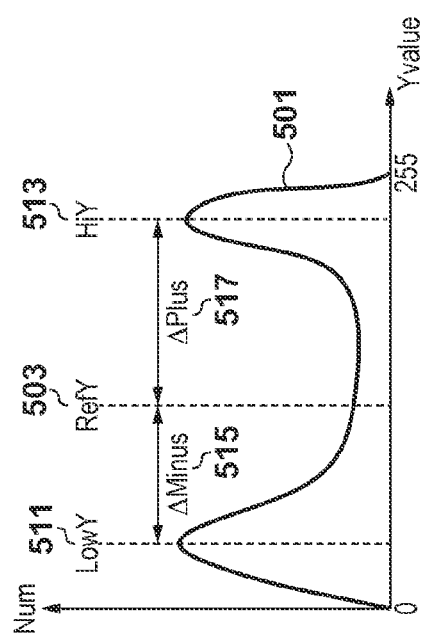
Figure 4B:
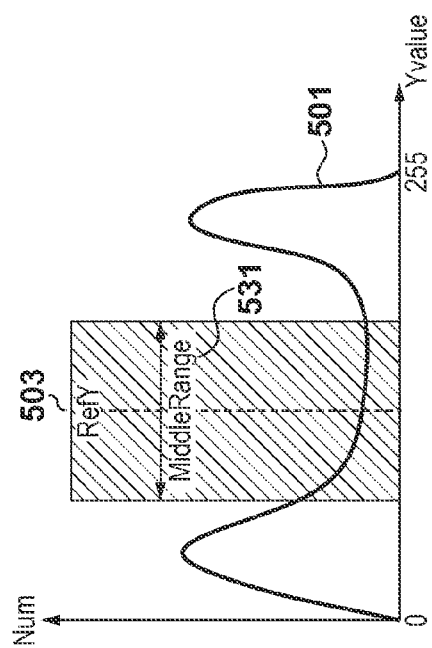

Although FIG. 4B illustrates a luminance histogram obtained from a luminance distribution of the overall image in FIG. 3, the methods for calculating the low-luminance side AEB amount and the high-luminance side AEB amount for bringing the low-luminance side and the high-luminance side closer to the target luminance RefY 503 differ from the methods illustrated in FIG. 4A. In FIG. 4A, the AEB amount is calculated so that the low-luminance peak value LowY 511 and the high-luminance peak value HiY 513 each approach the target luminance RefY 503. On the other hand, in FIG. 4B, the AEB amount is calculated so that an average value LowAveY 521 of the Y values of pixels in low-luminance regions (a low-luminance average value) and an average value HiAveY 523 of the Y values of pixels in high-luminance regions (a high-luminance average value) approach the target luminance RefY 503.

Although the calculation method indicated in FIG. 4A enables both the low-luminance peak value LowY 511 and the high-luminance peak value HiY 513 to approach the target luminance RefY 503, the method is a sensitive condition that responds even to slight luminance variations. Accordingly, a method that uses peak luminance values as shown in FIG. 4A and a method that uses average values of luminance regions that meet a predetermined condition as shown in FIG. 4B may be switched between based on the desired effect.

Figure 5:
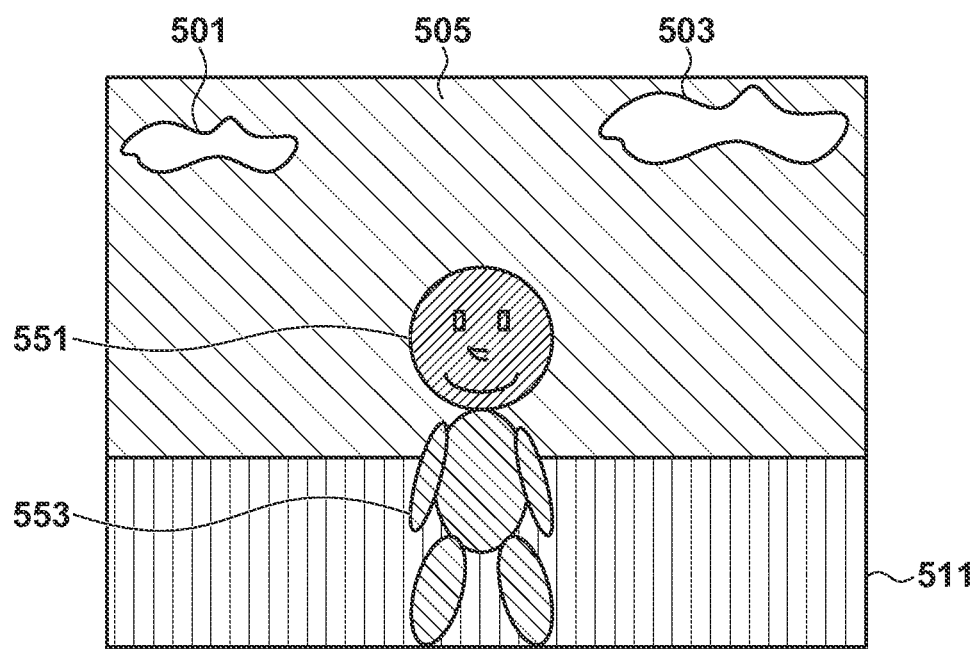
FIG. 5 is a diagram illustrating an example of a person scene.

FIG. 5 illustrates a scene in which a person is present in the image; the clouds 501 and 503, the sky 505, a face 551, a body 553, and the ground 511 are present in the image, and it is assumed that the sky, the clouds, and so on have high luminosities, whereas the person, the ground, and so on have low luminosities. When such a person scene is shot using AEB, it is desirable for the luminance of the face region of the person to be close to the target luminance when correcting the exposure toward the high-luminance side.

When finding an AEB amount for a person scene that obtains the target luminance for the face region of the person, a main distribution may be present on the low-luminance side of the luminance histograms shown in FIGS. 4A to 4C, but it is possible that the target luminance will not be obtained for the face region of the person even if the peak values or the average luminance values of the distributions have approached the target luminance RefY 503. A body region of the person, dark areas corresponding to the ground, and so on are also present in the low-luminance side distribution, and thus in principle, an accurate luminance value for the face region is not known. Moreover, to accurately find the luminance value of the face region, it is necessary to calculate the luminance value for only the face region from the image, rather than from the luminance histogram of the overall image.

Figure 6:
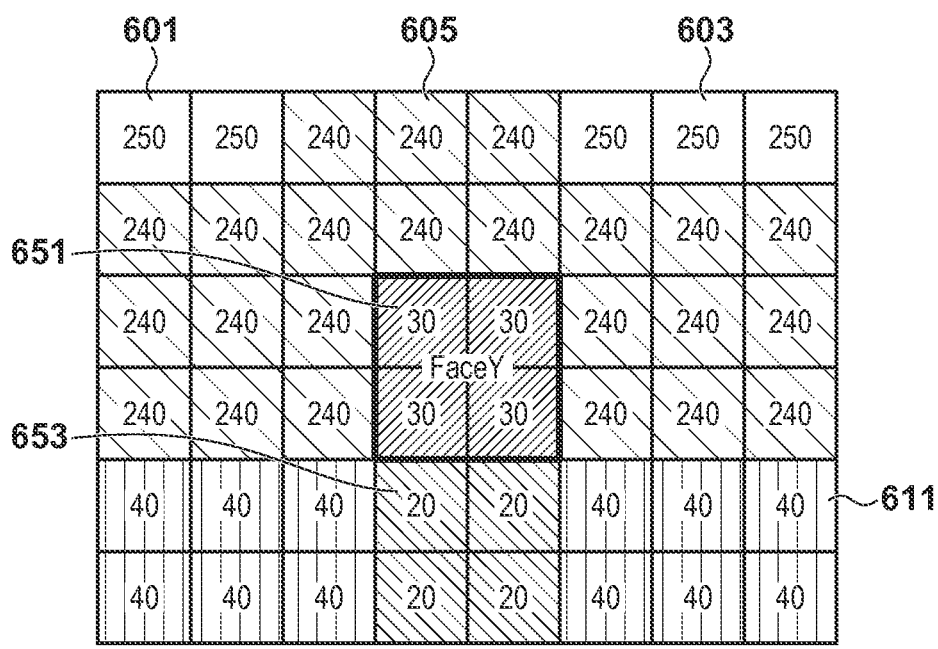
FIG. 6 is a diagram illustrating an example of luminance information for each of blocks in the image shown in FIG. 5.

FIG. 6 illustrates an example of an image in which the person in the scene shown in FIG. 5 is expressed as blocks. In the example shown in FIG. 6, the image is divided into 6 blocks on the vertical and 8 blocks on the horizontal, for a total of 48 blocks, and a luminance value is calculated for each block. Next, of these 48 blocks, an average luminance value of four blocks 651 that correspond to the face 551 of the person is FIG. 5 is calculated as a luminance value FaceY of the face region. Then, to set the luminance value FaceY of the face region to the target luminance, the luminance value Facey may be corrected using a face region AEB amount ΔPlusFace that brightens the face region by a number of stops calculated through the following formula.

$$\Delta PlusFace = \log_2(FaceY/RefY)$$

Although the image is divided into 48 blocks in FIG. 6, a more precise face region luminance value can be calculated if the image is divided into more blocks; alternatively, a desired region capable of covering the entire face region may be set, and calculations performed based thereon, rather than employing a matrix.

Although FIGS. 4A through 4C illustrate methods for calculating the AEB amount using luminance histograms of the overall image, there are cases, depending on the scene, where the calculation method that uses only a luminance histogram will not result in the optimal exposure. For example, in the case where a low-luminance and low-chroma black object such as a locomotive is present in the image, and the AEB amount is calculated so the luminance value of the black object approaches the target luminance, there are cases where the black object will become too bright and impart an unnatural impression on a viewer. Meanwhile, in the case where a high-luminance and high-chroma object such as a blue sky, fall foliage, new leaves, or the like is present in the image, there are cases where causing the luminance value of the high-chroma region to approach the target luminance will still result in a region that is too bright, and the high-chroma colors will be more marked by reducing the luminance slightly.

Figure 7:
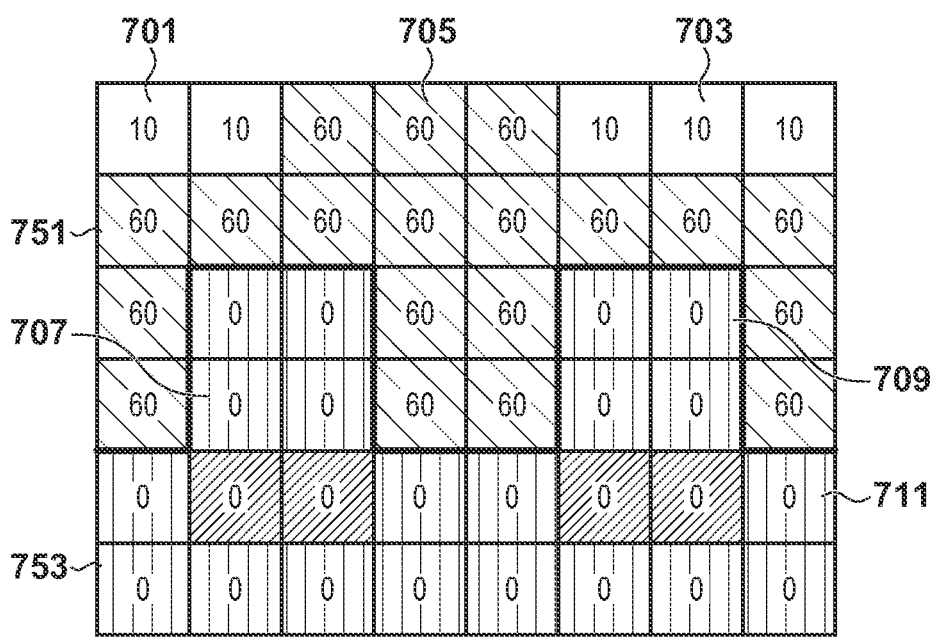
FIG. 7 is a diagram illustrating an example of chroma information for each of blocks in the image shown in FIG. 5.
Figure 8:
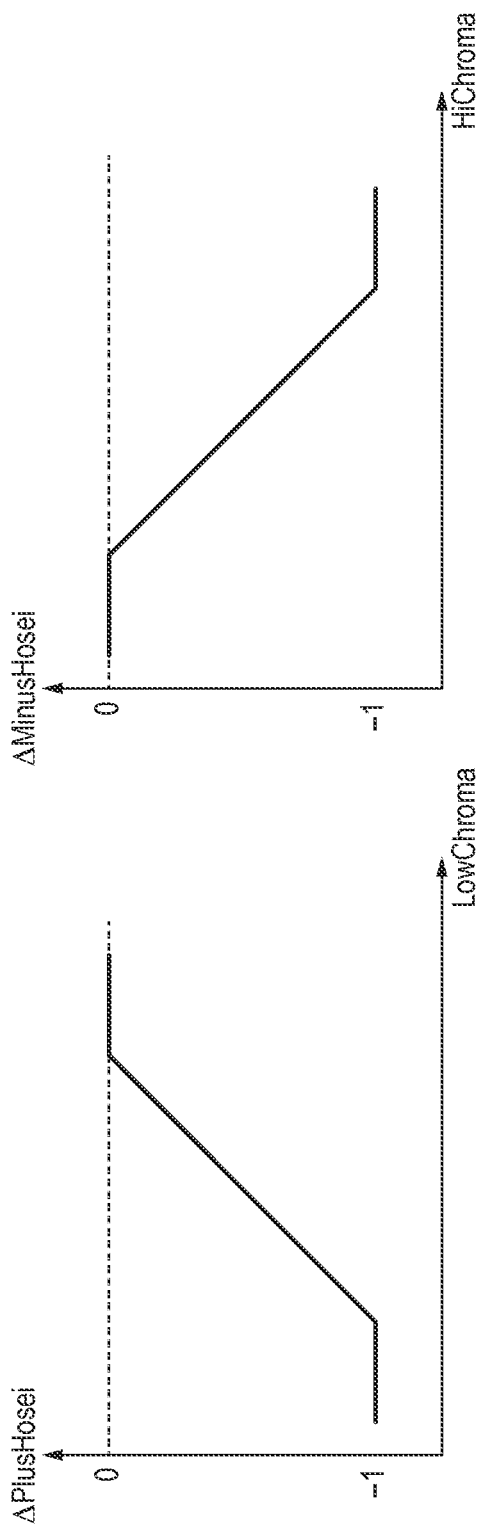
FIGS. 8A and 8B are diagrams illustrating AEB amount correction amounts based on the chroma information according to the embodiment.

FIG. 7 illustrates a case where the image in the landscape scene shown in FIG. 3 is divided into 48 blocks in the same manner as in FIG. 6, where a chroma value is indicated for each block. In FIG. 7, regions 701 and 703 corresponding to white clouds have low chroma, a region 705 corresponding to a blue sky has a high chroma, and trees 707 and 709 and ground 711 have low chroma. If the state shown in FIG. 7 is applied to the luminance histograms shown in FIGS. 4A to 4C, blocks within a bold frame 751 correspond to a high-luminance region, whereas blocks within a bold frame 753 correspond to a low-luminance region. An average chroma value HiChroma of a high luminance/high chroma region is calculated, and an AEB amount ΔPlus is corrected based on HiChroma so that the high-luminance region approaches the target luminance. Likewise, an average chroma value LowChroma of a low luminance/low chroma region is calculated, and an AEB amount ΔMinus is corrected based on LowChroma so that the low-luminance region approaches the target luminance. Note that the AEB amount correction amount used here may be prepared in advance as a table such as that shown in FIGS. 8A and 8B. In FIG. 8A, a positive correction amount ΔPlusHosei is determined in accordance with the chroma value LowChroma of the low luminance/low chroma region, and parameters that correct the exposure toward underexposure are set, so that the brightness of the object drops as the chroma decreases. Likewise, in FIG. 8B, a negative correction amount ΔMinusHosei is determined in accordance with the chroma value HiChroma of the high luminance/high chroma region, and parameters that correct the exposure toward underexposure are set, so that the brightness of the object drops as the chroma increases.

Shooting Operations

Next, shooting operations performed by the image capturing apparatus according to the present embodiment will be described with reference to FIGS. 9 through 14.

Note that the processes shown in FIGS. 9 through 14 are realized by the CPU of the system control unit 115 loading programs stored in the ROM into a working area of the RAM and executing those programs.

Figure 9:
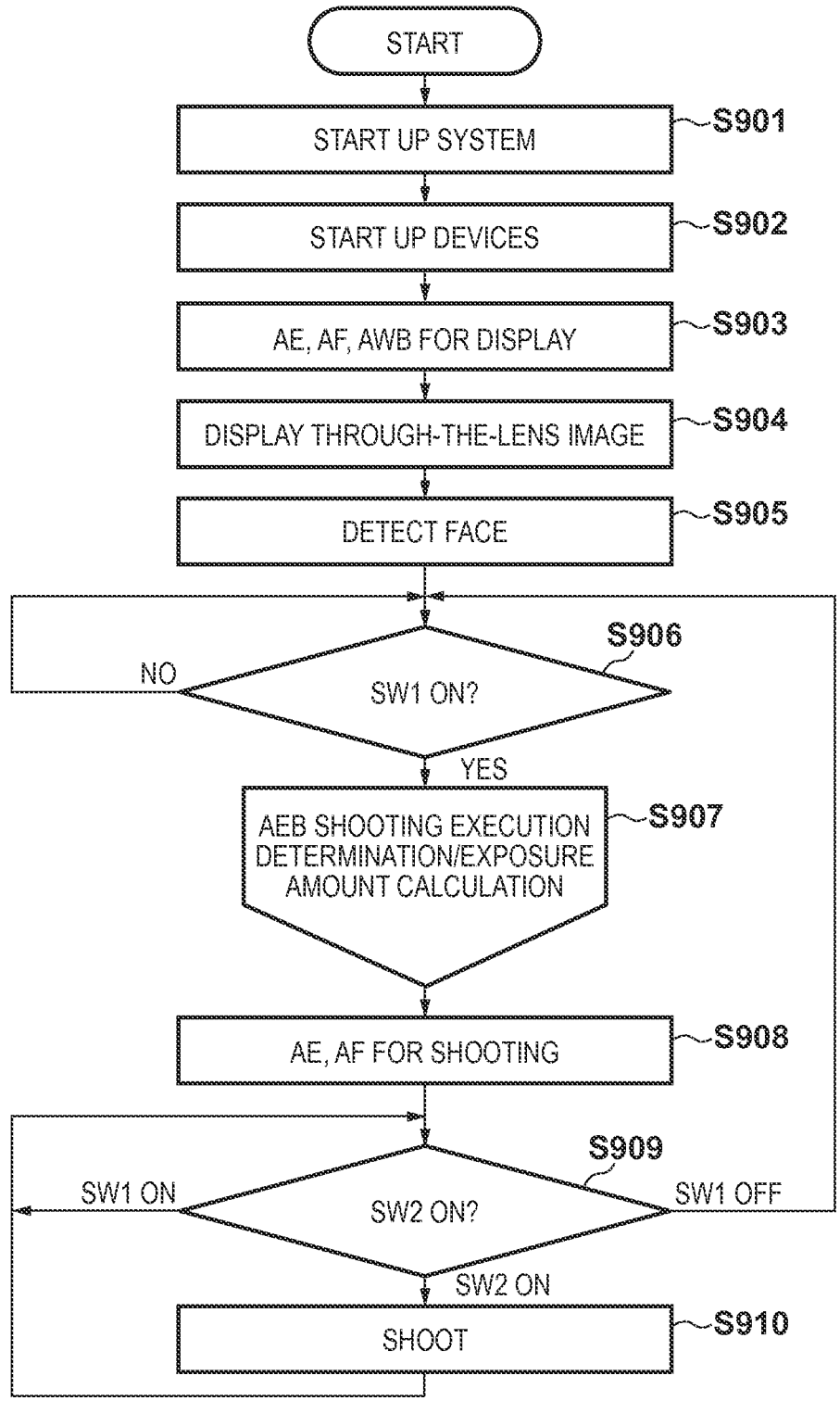
FIG. 9 is a flowchart illustrating shooting operations performed by the image capturing apparatus according to the embodiment.

In FIG. 9, when the apparatus 100 is turned on, the system control unit 115 carries out system startup processes, namely supplying power to the CPU and LSIs, supplying a clock signal, resetting memories and an OS, and so on, as required for the camera system to operate (step S901).

In step S902, the system control unit 115 performs processes for starting up the shooting lens 101, the aperture/shutter 102, the image capturing unit 103, and so on, using the optical system control unit 109, the image capturing control unit 110, and so on.

In step S903, the system control unit 115 uses the image processing unit 104 to extract luminance components, color components, focus information, and so on from the image signals sequentially output from the image capturing unit 103 and perform an AE process, an AF process, an AWB process, and so on.

In step S904, the system control unit 115 uses the image processing unit 104 to generate image data by performing a developing process on the image signals sequentially output from the image capturing unit 103 and display that image data in the display unit 108 (as a live view).

In step S905, the system control unit 115 uses the image processing unit 104 to carry out a face detection process, a personal authentication process, a line-of-sight detection process, and so on using the image data displayed in the display unit 108.

In step S906, the system control unit 115 stands by until the shutter switch is depressed halfway and the first switch signal SW1 is detected while in a live view. The process advances to step S907 in the case where the first switch signal SW1 has been detected.

In step S907, the system control unit 115 carries out the AEB shooting execution determination process, the AEB amount calculation process, and so on. Details of those processes will be given later with reference to FIGS. 10 through 14.

In step S908, the system control unit 115 uses the image processing unit 104 to carry out an AE process, an AF process, and so on on the image to be shot.

In step S909, the system control unit 115 stands by until the shutter switch is depressed fully and the second switch signal SW2 is detected. The process advances to step S910 in the case where the second switch signal SW2 has been detected, and returns to step S906 in the case where the first switch signal SW1 is no longer detected.

In step S910, the system control unit 115 performs shooting using AEB based on a result of the process performed in step S907, or in the case where the AEB shooting is not performed, performs normal shooting according to the shooting conditions determined in step S908.

AEB Shooting Execution Determination Process and AEB Amount Calculation Process

Next, the AEB shooting execution determination process and the AEB amount calculation process carried out in step S907 of FIG. 9 will be described with reference to FIG. 10.

Figure 10:
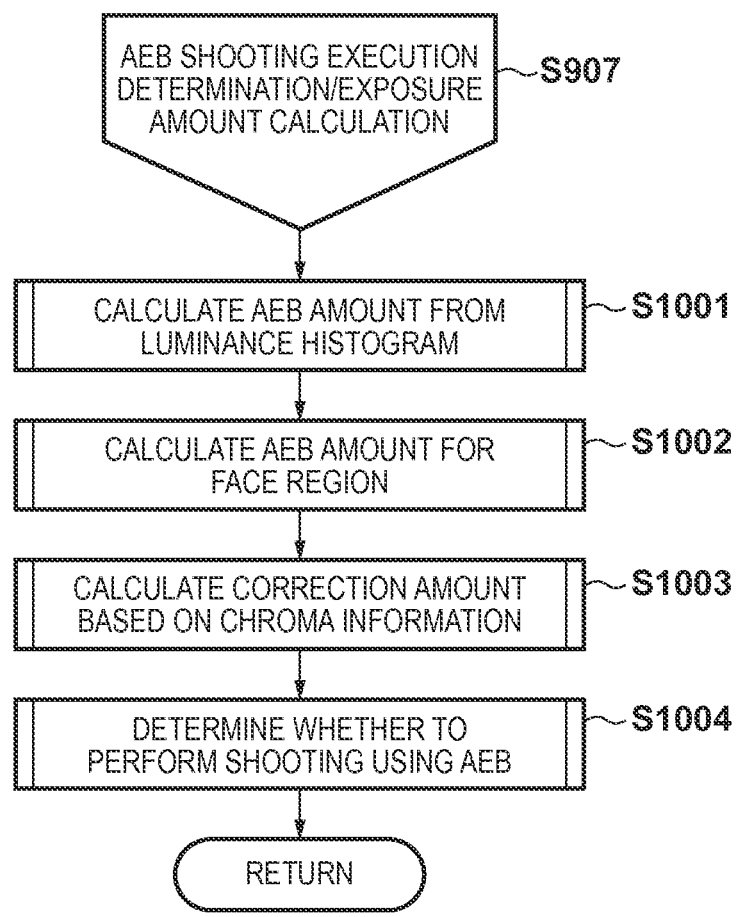
FIG. 10 is a flowchart illustrating an autoexposure bracketing shooting determination process indicated in FIG. 9.

In step S1001 of FIG. 10, the system control unit 115 calculates an AEB amount using the luminance histograms of the overall image as illustrated in FIGS. 3 to 4C.

In step S1002, the system control unit 115 calculates the face region AEB amount ΔPlusFace using the luminance value FaceY of the face region of the person, as illustrated in FIGS. 5 and 6.

In step S1003, the system control unit 115 calculates the correction amounts ΔPlusHosei and ΔMinusHosei for the face region AEB amount, using the chroma information as illustrated in FIG. 7.

In step S1004, the system control unit 115 determines whether or not to perform shooting using AEB and determines the AEB amount based on the values calculated in steps S1001 to S1003.

AEB Amount Calculation Process Using Luminance Histogram of Overall Image

Next, the process for calculating the AEB amount using the luminance histogram of the overall image, indicated in step S1001 of FIG. 10, will be described with reference to FIGS. 11A and 11B.

In step S1101 of FIG. 11A, the system control unit 115 uses the image processing unit 104 to generate the luminance histogram using the image data obtained by developing the image signals sequentially output from the image capturing unit 103.

In steps S1102 and S1103, the system control unit 115 calculates the luminance value LowY of the low-luminance region and the luminance value HiY of the high-luminance region from the luminance histogram generated in step S1101.

In step S1104, the system control unit 115 calculates a ratio of pixels distributed in an intermediate luminance region, based on the luminance histogram generated in step S1101. "Intermediate luminance" refers to a luminance in a luminance region that is within a predetermined range, using the target luminance RefY as a reference (that is, an intermediate luminance region), as shown in FIG. 4C. Then, a ratio of pixels MidPixelNum distributed in the intermediate luminance region to a number of pixels AllPixelNum in the overall image is calculated through the following formula as an intermediate luminance ratio MidYRatio.

$$MidYRatio = MidPixelNum/AllPixelNum * 100$$

Figure 11B:
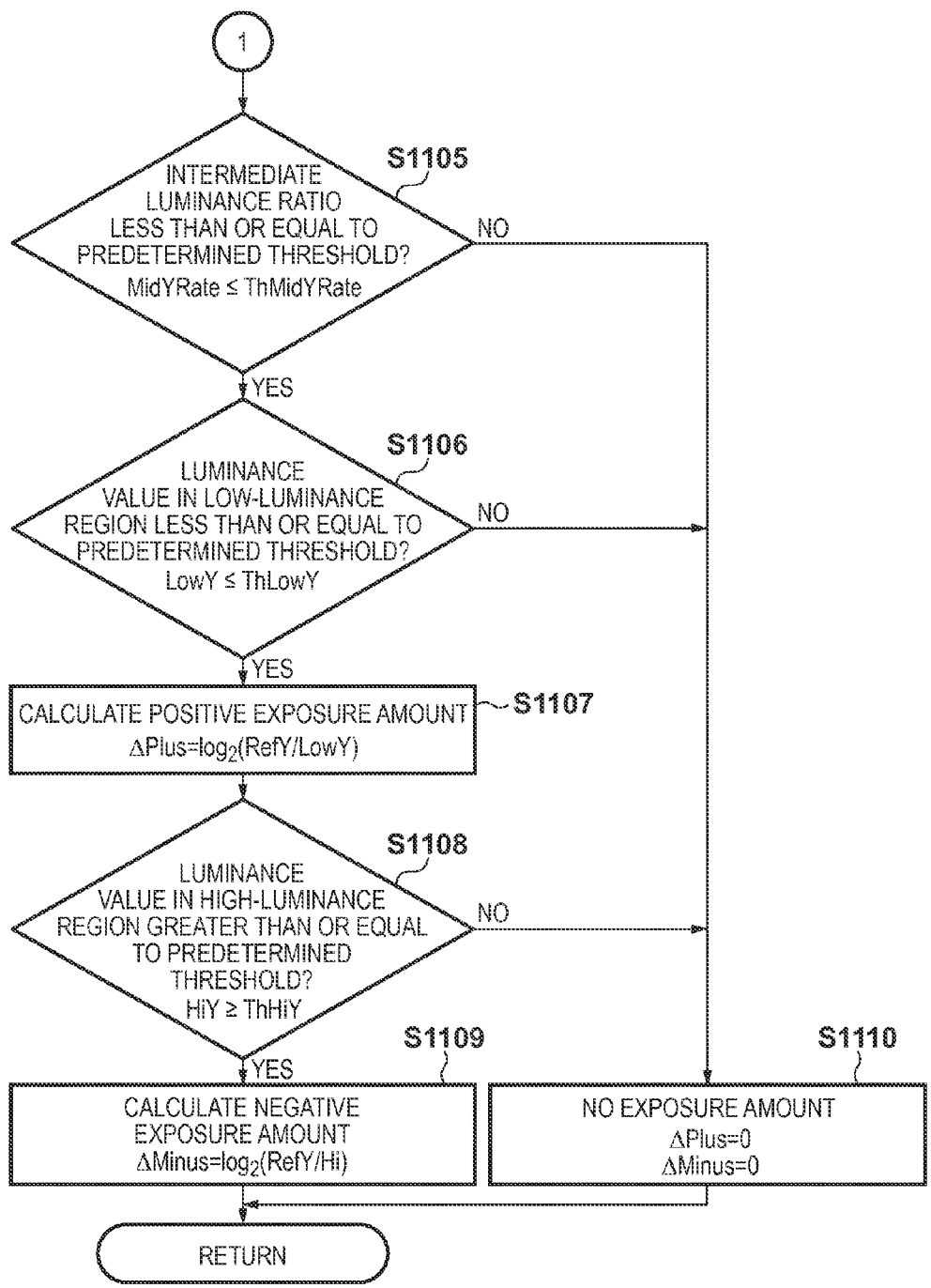

In step S1105 of FIG. 11B, the system control unit 115 determines whether the intermediate luminance ratio MidYRatio calculated in step S1104 is less than or equal to a predetermined threshold ThMidYRatio, and determines whether or not to perform shooting using AEB based on a result of the determination. In the case of a scene where the intermediate luminance ratio exceeds the predetermined threshold, the brightness of the image is near the target luminance and the contrast is low. Shooting such a scene using AEB will result in shadow-detail loss, highlight-detail loss, and the like in the overall image, and few regions will take on an appropriate exposure as a result of the exposure correction. Accordingly, in the case of a scene where the intermediate luminance ratio exceeds the predetermined threshold, shooting using AEB will have little effect, and thus the system control unit 115 determines in step S1110 not to perform shooting using AEB.

In step S1106, the system control unit 115 determines whether the luminance LowY of the low-luminance region is less than or equal to a predetermined first threshold ThLowY, and determines whether or not to perform shooting using AEB based on a result of this determination. In the case where the luminance LowY of the low-luminance region is near the target luminance, the AEB amount for bringing the low-luminance region closer to the target luminance is also reduced, making it less meaningful to shoot a plurality of images using AEB. Accordingly, in the case of a scene where the luminance of the low-luminance region exceeds the predetermined first threshold, the system control unit 115 determines not to perform shooting using AEB in step S1110.

In step S1107, because the luminance of the low-luminance region is less than or equal to the predetermined first threshold, the system control unit 115 calculates the AEB amount ΔPlus for correcting the exposure toward the high-luminance side through the following formula.

$$\Delta Plus = \log_2(RefY/LowY)$$

In step S1108, the system control unit 115 determines whether the luminance HiY of the high-luminance region is greater than or equal to a predetermined second threshold ThHiY, and determines whether or not to perform shooting using AEB based on a result of this determination. In the case where the luminance HiY of the high-luminance region is near the target luminance, the AEB amount for bringing the high-luminance region closer to the target luminance is also reduced, making it less meaningful to shoot a plurality of images using AEB. Accordingly, in the case of a scene where the luminance of the high-luminance region is less than the predetermined second threshold, the system control unit 115 determines not to perform shooting using AEB in step S1110.

In step S1109, because the luminance of the high-luminance region is greater than or equal to the predetermined second threshold, the system control unit 115 calculates the AEB amount ΔMinus for correcting the exposure toward the low-luminance side through the following formula.

$$\Delta Minus = \log_2(RefY/HiY)$$

The AEB amounts ΔPlus and ΔMinus are calculated using the luminance histogram in this manner.

AEB Amount Calculation Process Based on Luminance Information in Face Region of Person Next, the process for calculating the AEB amount using the luminance information of the face of a person, indicated in step S1002 of FIG. 10, will be described with reference to FIG. 12.

Whether or not the face of a person is present in the image, and the luminance value of the face region of the person, can be found as FaceY as described with reference to FIGS. 5 and 6.

Figure 12:
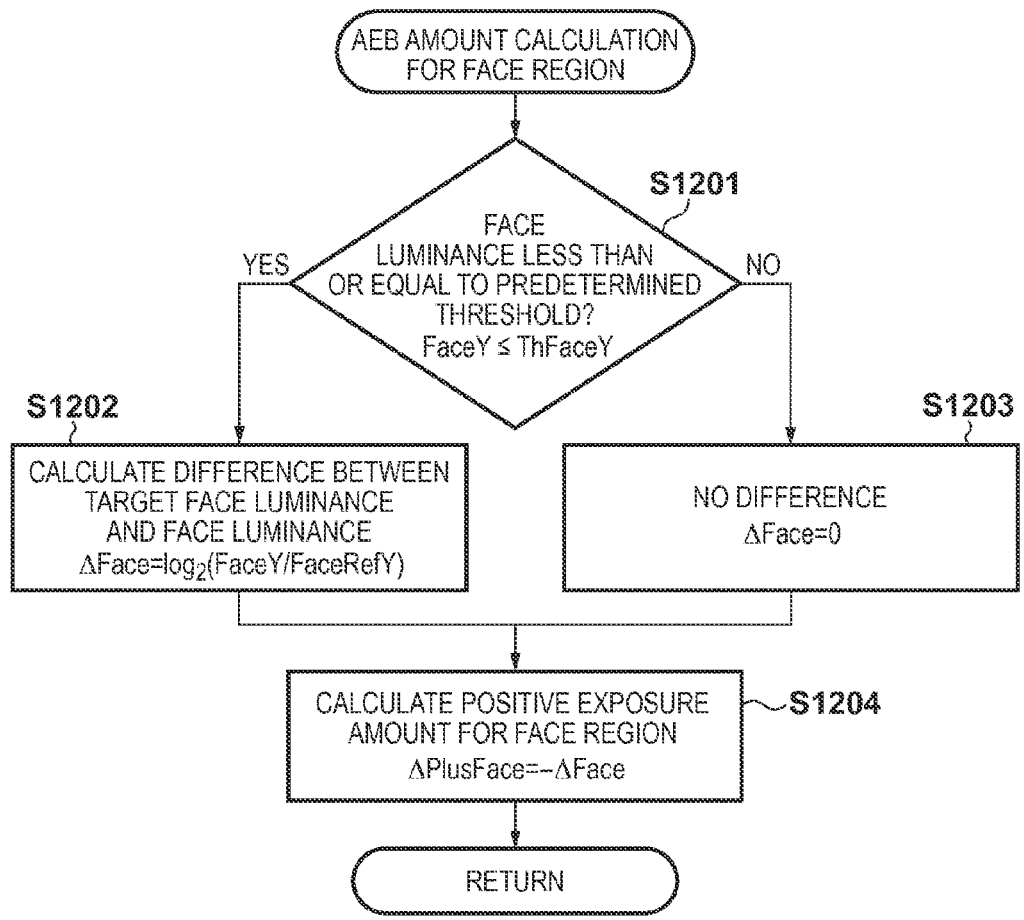
FIG. 12 is a flowchart illustrating an AEB amount calculation process, indicated in FIG. 10, that is based on luminance information in a face region of a person.

In step S1201 of FIG. 12, the system control unit 115 determines whether the luminance value FaceY of the face region of the person is less than or equal to a predetermined threshold ThFaceY. In the case where a result of the determination indicates that the luminance value FaceY is less than or equal to the predetermined threshold, the process advances to step S1202, whereas in the case where the luminance value FaceY exceeds the predetermined threshold, the process advances to step S1203.

In step S1202, the luminance value of the face of the person is low, and thus the system control unit 115 calculates the AEB amount ΔFace for shooting using AEB and correcting the luminance value of the face region to the target luminance through the following formula.

$$\Delta Face = \log_2(FaceY/RefY)$$

In step S1203, the system control unit 115 does not perform shooting using AEB, and thus ΔFace=0. This is because it is assumed that normal AE processing will achieve control so that the brightness of the face region is not shifted toward overexposure. However, the invention is not limited thereto, and in a scene where, for example, the background is dark and the AE process shifts the luminance of the face region toward overexposure due to the background, the AEB shooting may be performed to correct a face that is too bright to an appropriate exposure.

In step S1204, the system control unit 115 calculates the face region AEB amount ΔPlusFace through the following formula, based on the difference ΔFace between the luminance value FaceY of the face region of the person calculated in step S1202 and the target luminance.

$$\Delta PlusFace = -\Delta Face$$

AEB Amount Correction Amount Calculation Process Based on Chroma Information Next, the AEB amount correction amount calculation process using the chroma information, indicated in step S1003 of FIG. 10, will be described with reference to FIG. 13.

Figure 13:
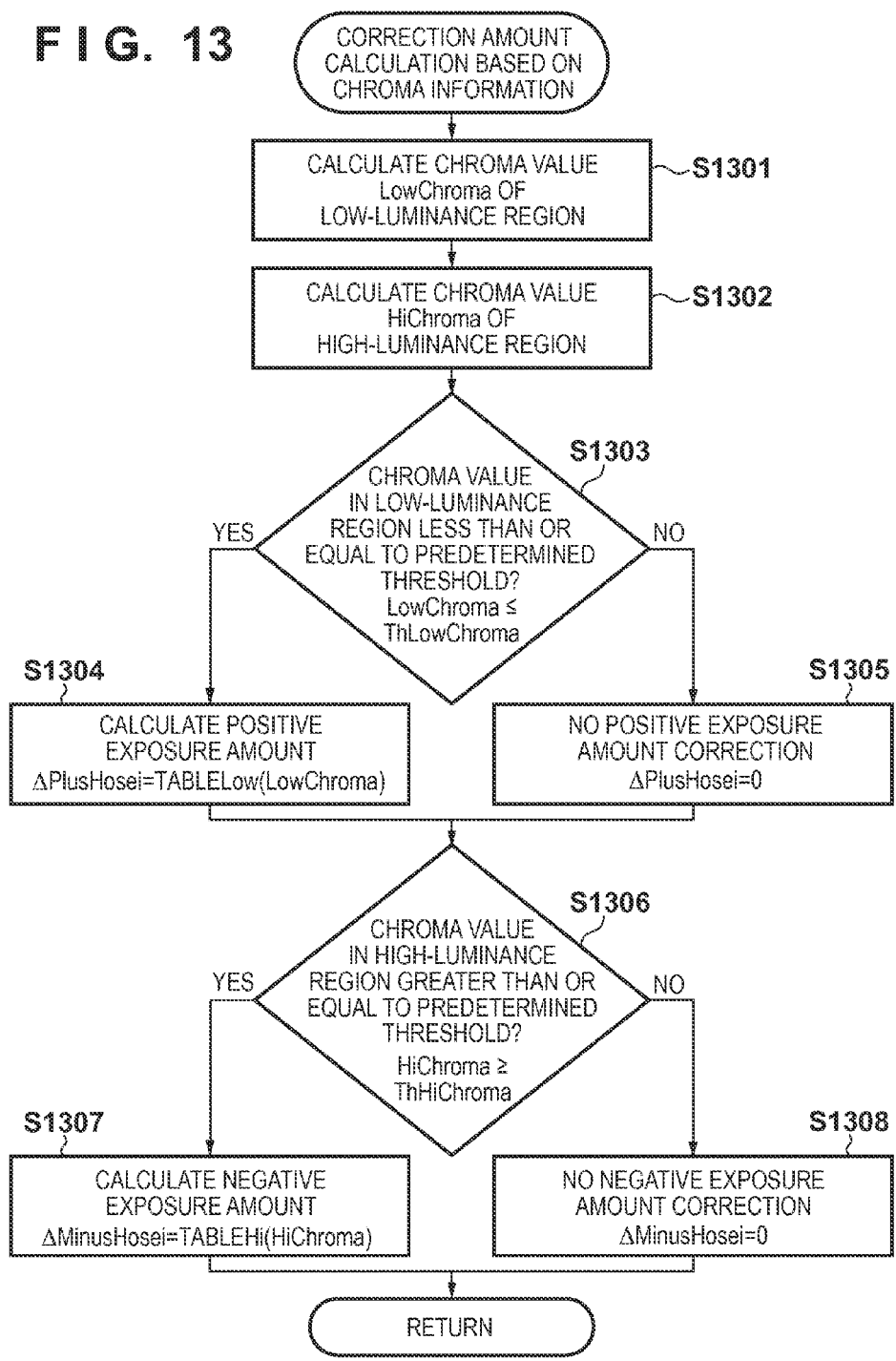
FIG. 13 is a flowchart illustrating an AEB amount correction amount calculation process, indicated in FIG. 10, that is based on chroma information.

In step S1301 of FIG. 13, the system control unit 115 calculates the chroma value LowChroma of the low luminance/low chroma region in the image, as illustrated in FIG. 7.

Likewise, in step S1302, the system control unit 115 calculates the chroma value HiChroma of the high luminance/high chroma region.

In step S1303, the system control unit 115 determines whether the chroma value LowChroma of the low luminance/low chroma region is less than or equal to a predetermined third threshold ThLowChroma. In the case where a result of the determination indicates that the chroma value LowChroma is less than or equal to the predetermined third threshold, the process advances to step S1304, whereas in the case where the chroma value LowChroma exceeds the predetermined third threshold, the process advances to step S1305.

In step S1304, the system control unit 115 calculates the correction amount ΔPlusHosei for correcting the AEB amount in accordance with a table TABLELow (LowChroma) as shown in FIG. 8A. This is because there are cases where shooting an object in the low luminance/low chroma region with a certain degree of darkness rather than indiscriminately using the target luminance can better reproduce the atmosphere of that object.

In step S1305, an object in a low luminance/high chroma region has a better appearance when shot at the target luminance, and this the system control unit 115 does not correct the AEB amount and uses that AEB amount as-is (ΔPlusHosei=0) to avoid underexposure.

In step S1306, the system control unit 115 determines whether the chroma value HiChroma of the high luminance/high chroma region is greater than or equal to a predetermined fourth threshold ThHiChroma. In the case where a result of the determination indicates that the chroma value HiChroma is greater than or equal to the predetermined fourth threshold, the process advances to step S1307, whereas in the case where the chroma value HiChroma is less than the predetermined fourth threshold, the process advances to step S1308.

In step S1307, the system control unit 115 calculates the correction amount ΔMinusHosei for correcting the AEB amount in accordance with a table TABLEHi (HiChroma) as shown in FIG. 8B. This is because a high-luminance and high-chroma object such as a sky, a sunset, or the like has better color reproduction if shot slightly underexposed relative to the target luminance.

In step S1308, the system control unit 115 does not correct the AEB amount and uses the AEB amount as-is (ΔMinusHosei=0) so as to avoid underexposure. This is because objects in high luminance/low chroma regions, such as scenes containing white clouds, snow, or the like have a better appearance when shot at the target luminance.

AEB Shooting Execution Determination Process

Next, the AEB shooting execution determination process carried out in step S1004 of FIG. 10 will be described with reference to FIG. 14.

Figure 14:
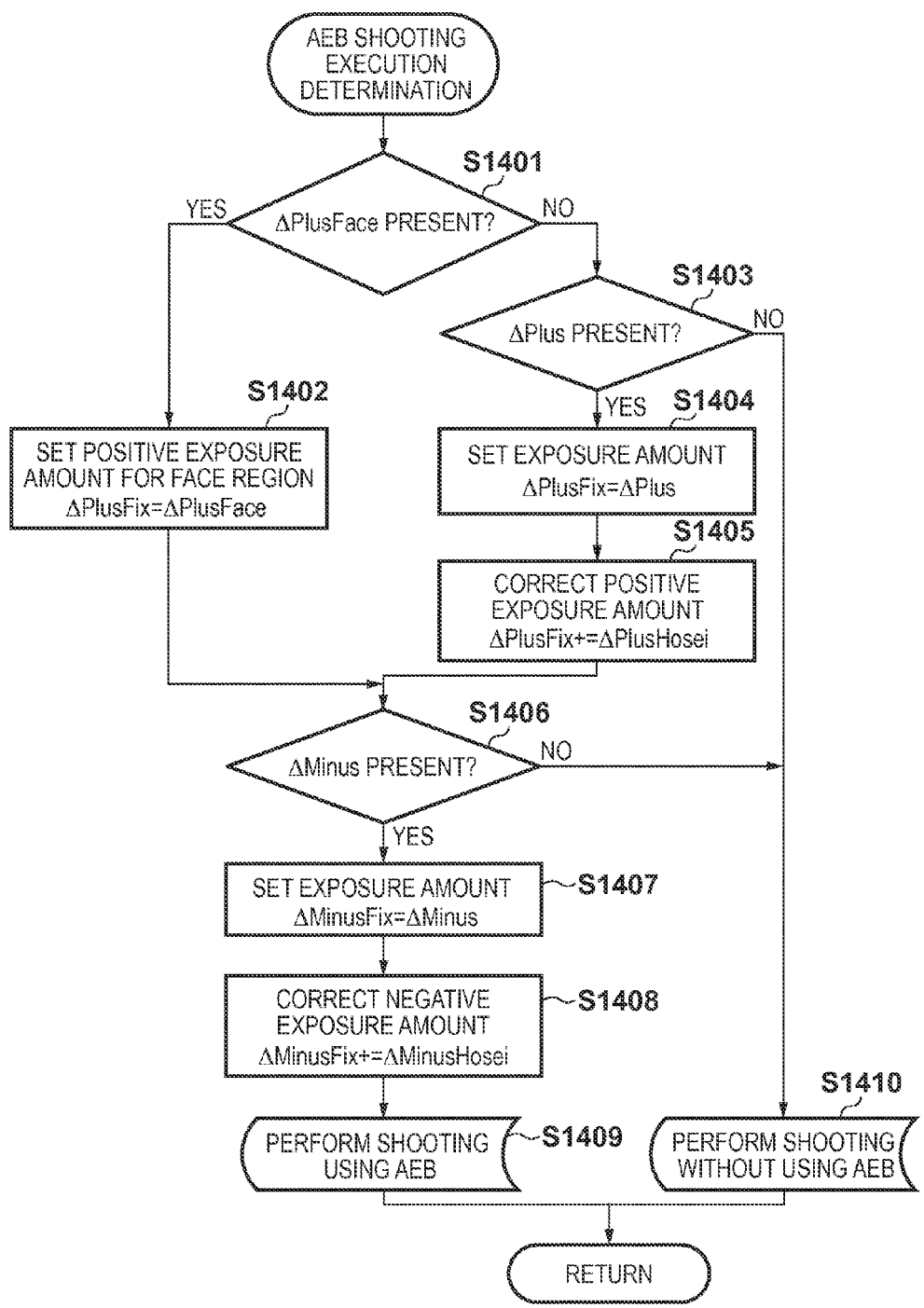
FIG. 14 is a flowchart illustrating an AEB shooting execution determination process indicated in FIG. 10.

In the processing illustrated in FIG. 14, the AEB amounts ΔPlus, ΔMinus, and ΔPlusFace and the correction amounts ΔPlusHosei and ΔMinusHosei calculated as described in FIGS. 11 to 13 are used to determine whether or not to perform shooting using AEB and to determine the final AEB amount.

In step S1401 of FIG. 14, the system control unit 115 determines whether the face region AEB amount ΔPlusFace calculated from the luminance value of the face region of the person as described in FIG. 12 has a value. In the case where a result of the determination indicates that there is a value, the process advances to step S1402, whereas in the case where there is no value, the process advances to step S1403.

In step S1402, a face region is present in the image and the face region has a low luminance, and thus the system control unit 115 sets the value of the face region AEB amount ΔPlusFace to AEB amount ΔPlusFix.

In step S1403, the system control unit 115 determines whether the AEB amount ΔPlus calculated from the luminance histogram of the overall image as illustrated in FIGS. 11A and 11B has a value. In the case where a result of the determination indicates that there is a value, the process advances to step S1404, whereas in the case where there is no value, the process advances to step S1410.

In step S1401, the system control unit 115 sets the value of the positive AEB amount ΔPlus to the AEB amount ΔPlusFix.

In step S1405, the system control unit 115 adds the correction amount ΔPlusHosei calculated using the chroma as illustrated in FIG. 13 to the positive AEB amount ΔPlusFix.

In step S1406, the system control unit 115 determines whether the AEB amount ΔMinus calculated from the luminance histogram of the overall image as illustrated in FIGS. 11A and 11B has a value. In the case where a result of the determination indicates that there is a value, the process advances to step S1407, whereas in the case where there is no value, the process advances to step S1410.

In step S1407, the system control unit 115 sets the value of the AEB amount ΔMinus to an AEB amount ΔMinusFix.

In step S1408, the system control unit 115 adds the correction amount ΔMinusHosei calculated in using the chroma as illustrated in FIG. 13 to the AEB amount ΔMinusFix.

In step S1409, the system control unit 115 performs shooting using AEB based on the values of the AEB amounts ΔPlusFix and ΔMinusFix, and ends the processing.

In step S1410, the system control unit 115 ends the processing without shooting using AEB.

According to the present embodiment as described thus far, a proper AEB amount is determined based on the luminance histogram of the overall image, the luminance of the face region of the person, and the chroma of the low-luminance region, the high-luminance region, and the like, and thus shooting can be performed using the optimal AEB for a given scene. Although the present embodiment determines the AEB amount based on the chroma, it should be noted that shooting using the optimal AEB for a given scene can be carried out more easily than with past techniques even if the AEB amount is not determined based on the chroma.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-280064, filed Dec. 21, 2012, which is hereby incorporated by reference herein in its entirety.

What is claimed is:

1. An image capturing apparatus comprising:
   a capturing unit configured to capture an image;
   a detection unit configured to detect an object from the captured image;
   a generating unit configured to generate a luminance distribution of the captured image;
   a calculating unit configured to calculate, based on the luminance distribution, an exposure amount used when performing autoexposure bracketing that captures a plurality of images at different exposures; and
   a correcting unit configured to correct the calculated exposure amount based on feature information of the object detected by the detection unit,
   wherein the generating unit generates a luminance histogram from luminance information of a plurality of blocks in the captured image,
   wherein the detection unit detects a face region of a person in the captured image,
   wherein the calculating unit calculates a main distribution on a low-luminance side and a main distribution on a high-luminance side from the luminance histogram and calculates the exposure amount so that a luminance value determined from the main distribution on the low-luminance side approaches a target value and a luminance value determined from the main distribution on the high-luminance side approaches the target value, and
   wherein the correcting unit corrects the exposure amount based on the feature information of the face region of the person.

2. The apparatus according to claim 1, further comprising:
   a determining unit configured to determine whether or not to perform the autoexposure bracketing using the calculated exposure amount,
   wherein the determining unit calculates, from the luminance histogram, an intermediate luminance ratio that is a ratio of pixels distributed in an intermediate luminance region to a number of pixels in the image; and
   wherein the determining unit determines not to perform the autoexposure bracketing in a case where the intermediate luminance ratio is greater than a predetermined threshold.

3. The apparatus according to claim 1, further comprising:
   a determining unit configured to determine whether or not to perform the autoexposure bracketing using the calculated exposure amount,
   wherein the determining unit determines to perform the autoexposure bracketing in a case where a luminance value determined from the main distribution on the low-luminance side is less than or equal to a predetermined first threshold or a luminance value determined from the main distribution on the high-luminance side is greater than or equal to a predetermined second threshold.

4. The apparatus according to claim 1, further comprising:
   a determining unit configured to determine whether or not to perform the autoexposure bracketing using the calculated exposure amount,
   wherein the calculating unit calculates a luminance value of a face of the person detected by the detection unit; and
   wherein the determining unit determines to perform the autoexposure bracketing in a case where the luminance value of the face is less than or equal to a predetermined threshold.

5. The apparatus according to claim 4,
   wherein the calculating unit calculates the exposure amount so that the luminance value of the face approaches a target value in a case where the calculated luminance value of the face is less than or equal to a predetermined threshold.

6. The apparatus according to claim 1,
   wherein the generating unit divides the captured image into a plurality of blocks and calculates chroma information of each of the blocks; and
   wherein the correcting unit corrects the exposure amount calculated based on the main distribution on the low-luminance side toward underexposure in a case where the chroma information of each block contained in the main distribution on the low-luminance side is less than or equal to a predetermined third threshold.

7. The apparatus according to claim 1,
wherein the generating unit calculates chroma information of each of the blocks; and
wherein the correcting unit corrects the exposure amount calculated based on the main distribution on the high-luminance side toward underexposure in a case where the chroma information of each block contained in the main distribution on the high-luminance side is greater than or equal to a predetermined fourth threshold.

8. The apparatus according to claim 1,
wherein the luminance value determined from the main distribution on the low-luminance side is a peak luminance value of the main distribution on the low-luminance side, and
wherein the luminance value determined from the main distribution on the high-luminance side is a peak luminance value of the main distribution on the high-luminance side.

9. The apparatus according to claim 1,
wherein the luminance value determined from the main distribution on the low-luminance side is an average luminance value of the main distribution on the low-luminance side, and
wherein the luminance value determined from the main distribution on the high-luminance side is an average luminance value of the main distribution on the high-luminance side.

10. A control method of an image capturing apparatus having a capturing unit that captures an image and a detection unit that detects an object from the captured image, the method comprising:
generating a luminance distribution of the captured image;
calculating, based on the luminance distribution, an exposure amount used when performing autoexposure bracketing that captures a plurality of images at different exposures; and
correcting the calculated exposure amount based on feature information of the object detected by the detection unit,
wherein the generating the luminance distribution includes generating a luminance histogram from luminance information of a plurality of blocks in the captured image,
wherein the detection unit detects a face region of a person in the captured image,
wherein the calculating includes calculates a main distribution on a low-luminance side and a main distribution on a high-luminance side from the luminance histogram and calculates the exposure amount so that a luminance value determined from the main distribution on the low-luminance side approaches a target value and a luminance value determined from the main distribution on the high-luminance side approaches the target value, and
wherein the correcting the calculated exposure amount includes calculating the exposure amount based on the feature information of the face region of the person.

11. A non-transitory computer-readable storage medium storing a program for causing a computer to execute the control method according to claim 10.

* * * * *